US008553929B2

(12) United States Patent
Motoyama

(10) Patent No.: US 8,553,929 B2
(45) Date of Patent: Oct. 8, 2013

(54) IMAGE PROCESSING APPARATUS, IMAGE DATA OUTPUT PROCESSING APPARATUS AND IMAGE PROCESSING METHOD

(75) Inventor: Kiyoto Motoyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 428 days.

(21) Appl. No.: 12/925,796

(22) Filed: Oct. 28, 2010

(65) Prior Publication Data

US 2011/0103640 A1    May 5, 2011

(30) Foreign Application Priority Data

Oct. 29, 2009    (JP) ................................. 2009-249288

(51) Int. Cl.
*G06K 9/36*    (2006.01)
(52) U.S. Cl.
USPC .......................................... 382/100; 382/284
(58) Field of Classification Search
USPC .......................................... 382/100, 284, 249
See application file for complete search history.

(56) References Cited

U.S. PATENT DOCUMENTS

| | | | | |
|---|---|---|---|---|
| 6,847,740 B1 * | 1/2005 | Birkle | ............................ | 382/276 |
| 2006/0222265 A1 * | 10/2006 | Keshet | ............................ | 382/298 |
| 2008/0159615 A1 | 7/2008 | Rudaz et al. | | |
| 2008/0309981 A1 | 12/2008 | Mori | | |
| 2009/0010487 A1 | 1/2009 | Maeno | | |

FOREIGN PATENT DOCUMENTS

| | | | |
|---|---|---|---|
| CN | 1962287 A | 5/2007 | |
| JP | 2002-320085 A | 10/2002 | |
| JP | 2006-352745 A | 12/2006 | |
| JP | 2008-530666 A | 8/2008 | |
| JP | 2008-211616 A | 9/2008 | |
| JP | 2008-312139 A | 12/2008 | |
| WO | WO2009-104606 A1 | 8/2009 | |

OTHER PUBLICATIONS

Tsekeridou et al. "Embedding Self-Similar Watermarks in the Wavelet Domain." IEEE International Conference on Acoustics, Speech, and Signal Processing, vol. 4, 2000, pp. 1967-1970.*
Cao et al. "A Watermarking Method Based on Fractal Self-Similarity." Proceedings of the 5th International Conference on Signal Processing, vol. 1, 2000, pp. 99-102.*
Solachidis et al. "Self-Similar Ring Shaped Watermark Embedding in 2-D DFT domain." 10th European Signal Processing Conference, Sep. 2000, 4 pages.*

* cited by examiner

*Primary Examiner* — Jon Chang
(74) *Attorney, Agent, or Firm* — Edwards Wildman Palmer LLP; David G. Conlin; David A. Tucker

(57) ABSTRACT

An image processing apparatus of the present invention includes: a self-similar image storing section 13 that stores a pattern of a self-similar image; a superimposed image data generating section 15 that generates superimposed image data from a self-similar image, based on the pattern of the self-similar image; an image combining section 17 that combines original image data with the superimposed image data; and a control section 11 that controls operations of the above-mentioned sections. The superimposed image data generating section 15 adjusts a pattern of a self-similar image so that a size of a superimposed image corresponds to a draw size of an original image which draw size is determined by the control section 11. It is therefore possible to combine the original image data with the superimposed image data so that the superimposed image is suitably drawn regardless of the draw size of the original image.

8 Claims, 6 Drawing Sheets

Leaf CURVE

Tree CURVE

Koho CURVE

Gasket CURVE

IMAGE PROCESSING APPARATUS, IMAGE DATA OUTPUT PROCESSING APPARATUS AND IMAGE PROCESSING METHOD

This Nonprovisional application claims priority under 35 U.S.C. §119(a) on Patent Application No. 2009-249288 filed in Japan on Oct. 29, 2009, the entire contents of which are hereby incorporated by reference.

TECHNICAL FIELD

The present invention relates to: an image processing apparatus and an image processing method which combine, with image data of an original image, superimposed image data that is image data of an image to be superimposed on the original image.

BACKGROUND ART

Conventionally, there has been known a technique of drawing (displaying or printing) an image by superimposing a predetermined image (for example, a digital watermark image, a background pattern or the like) on image data of an original image.

For example, Patent Literature 1 discloses the following technique: a plurality of digital watermarks are generated by use of a plurality of keys that differ depending on a feature of a content or elapse of time, and each of the generated plurality of digital watermarks is then embedded in a corresponding signal to be processed. This allows a proper detector to effectively and accurately detect a digital watermark by extracting the feature of the content. Further, this also makes it impossible for a third person who does not know the plurality of keys to detect the digital watermark from the signal in which the digital watermark is embedded.

Patent Literature 1
Japanese Patent Application Publication, Tokukai, No. 2002-320085 A (Publication Date: Oct. 31, 2002)

SUMMARY OF INVENTION

However, in the technique of Patent Literature 1, in a case where image data of an original image and a digital watermark are drawn by being superimposed on each other, it is possibly difficult to determine whether or not the digital watermark image is a predetermined digital watermark image. This is because a shape and a size of the digital watermark image differ depending on a draw size (variable magnification or aspect ratio) of the original image.

Further, in a case where a background pattern is superimposed on the original image, a shape and a size of the background pattern differ depending on the draw size of the original image. This possibly impairs design.

The present invention is made in view of the problem, and an object of the present invention is to provide an image processing apparatus that combines, with image data of an original image, superimposed image data that is image data of an image to be superimposed on the original image, the image processing apparatus capable of combining the original image data with the superimposed image data so as to suitably draw the superimposed image regardless of the draw size of the original image.

In order to attain the object, an image processing apparatus of the present invention is an image processing apparatus which combines, with original image data that is image data of an original image, superimposed image data that is image data of an image to be superimposed on the original image, the image processing apparatus, including: at least one of (i) a self-similar image storing section that stores one or more patterns of self-similar images and (ii) a self-similar image detecting section that detects a pattern of a self-similar image that is combined with the original image data; a superimposed image data generating section that generates the superimposed image data from a self-similar image, based on the pattern of the self-similar image; an image combining section that generates composite image data by combining the original image data with the superimposed image data; and a size determining section that determines a draw size of the original image in a case where the original image is drawn, the superimposed image data generating section generating the superimposed image data by adjusting the pattern of the self-similar image so that a size of the superimposed image corresponds to the draw size.

Further, an image processing method of the present invention is an image processing method for combining, with original image data that is image data of an original image, superimposed image data that is image data of an image to be superimposed on the original image, the image processing method including the steps of: determining a draw size of the original image in a case where the original image is drawn; generating the superimposed image data from a self-similar image, based on a pattern of a self-similar image which is stored in advance or a pattern of a self-similar image which is combined in advance with the original image data; and generating composite image data by combining the original image data with the superimposed image data, in the step of generating the superimposed image data, the superimposed image data being generated by adjusting the pattern of the self-similar image so that a size of the superimposed image corresponds to the draw size.

Advantageous Effects of Invention

According to an image processing apparatus and an image processing method of the present invention, it is possible to combine, with an original image, a superimposed image whose micro part appears substantially constant in size and shape regardless of a draw size of the original image. This prevents the superimposed image from being not suitably detected and also prevents design of the superimposed image from being impaired, depending on the draw size of the original image.

Figure 1:
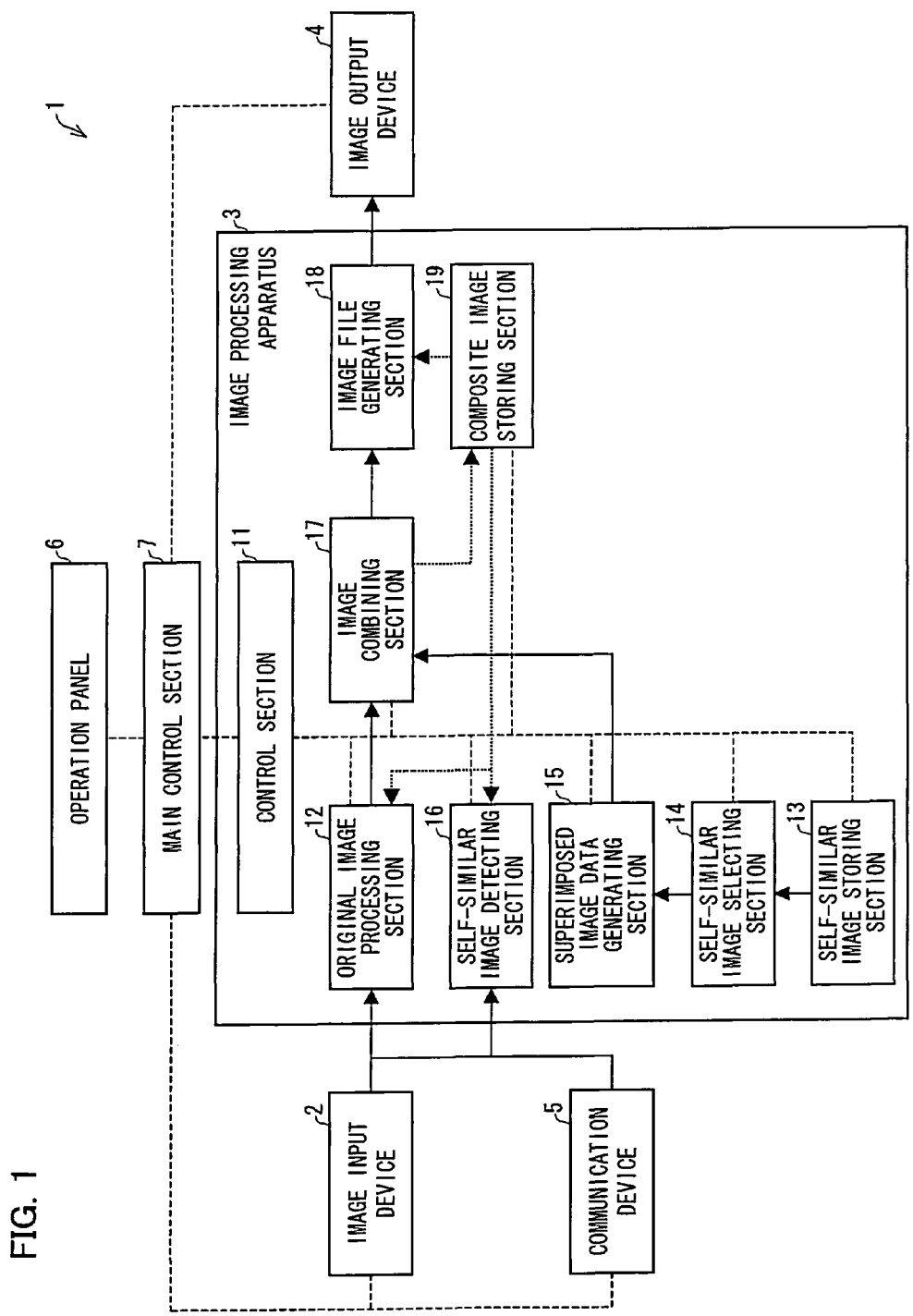
FIG. 1 is a block diagram that schematically shows a configuration of (i) an image processing apparatus in accordance with an embodiment of the present invention and (ii) an image forming apparatus that includes the image processing apparatus.

Each of FIG. 2(a) to FIG. 2(d) is an explanatory diagram that shows an example of a self-similar image to be superimposed on original image data in the image processing apparatus shown in FIG. 1.

Figure 3:
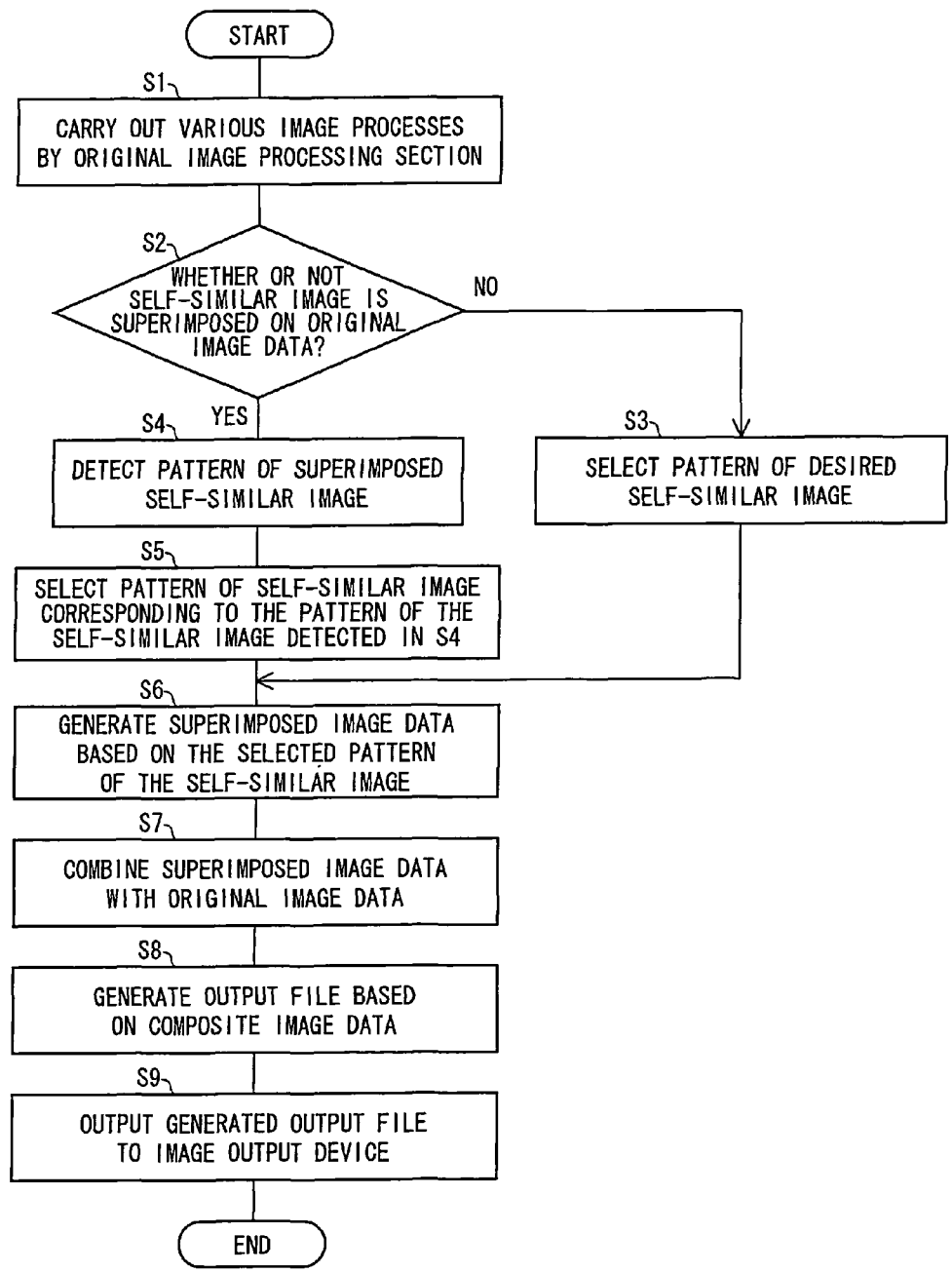

FIG. 3 is a flowchart that shows a flow of processes carried out in the image processing apparatus shown in FIG. 1.

Each of FIG. 4(a) to FIG. 4(c) is an explanatory diagram that shows an example of an output image in a case where an image in which a self-similar image is superimposed as a background pattern is reproduced.

Figure 5:
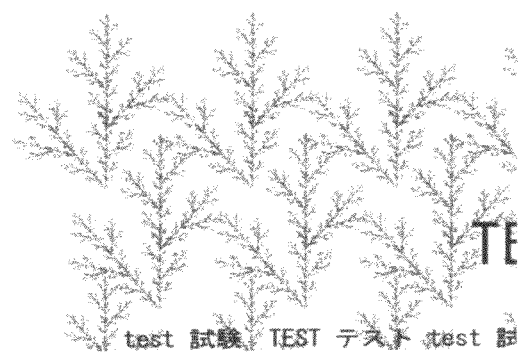

FIG. 5 is an explanatory diagram that shows another example of an output image in a case where an image in which a self-similar image is superimposed as a background pattern is reproduced.

Each of FIG. 6(a) to FIG. 6(e) is an explanatory diagram that explains a process of superimposing a self-similar image as a digital watermark image.

DESCRIPTION OF EMBODIMENTS

The following describes an embodiment of the present invention.

FIG. 1 is a block diagram that schematically shows a configuration of an image forming apparatus (image data output processing apparatus) 1 that includes an image processing apparatus 3 in accordance with the present embodiment. As shown in FIG. 1, the image forming apparatus 1 includes an image input device 2, the image processing apparatus 3, an image output device (image output section) 4, a communication device 5, an operation panel 6 and a main control section 7.

The image input device 2 reads an original image and generates original image data. The image input device 2 is configured by a scanning section (not shown) that includes a device such as a CCD (Charge Coupled Device) which converts optical information into an electric signal. In the present embodiment, the image input device 2 outputs, to the image processing apparatus 3, image data in accordance with an image of reflected light from an original image as original image data of RGB (R: red, G: green, B: blue).

The image processing apparatus 3 (i) converts the original image data that is inputted from the image input device 2 into image data in accordance with an output process that is carried out by the image output device 4, (ii) generates composite image data by combining, with the original image data, superimposed image data that is image data of a superimposed image made of a self-similar image, and (iii) outputs the composite image data to the image output device 4. Note that the image processing apparatus 3 is described in detail later.

The image output device 4 prints (draws), on a recording material, an image that is inputted from the image processing apparatus 3. A configuration of the image output device 4 is not particularly limited. The image output device 4 may be, for example, an electrophotographic image forming apparatus or an ink-jet image forming apparatus.

Further, the configuration of the image output device 4 is not limited to a configuration in which an image in accordance with image data is printed on a recording material, but the image output device 4 may have a configuration in which the image in accordance with the image data is displayed (drawn) on a display device. Examples of the display device include a liquid crystal display, a plasma display, an organic EL display and a CRT.

The communication device 5 is configured by, for example, a modem or a network card. The communication device 5 exchanges data with other devices (for example, a personal computer, a server device, a display device, another digital multifunction printer and a facsimile device) which are connected to a network via a network card, a LAN cable or the like.

In a case where the communication device 5 transmits the image data, the communication device 5 carries out a transmission procedure with the other end so as to secure a transmittable state, and then sequentially transmits, to the other end via communication lines, image data that is outputted from the image processing apparatus 3. In this case, the image processing apparatus 3 (i) reads, from a memory (hereinafter referred to as composite image storing section 19), the image data to be transmitted, (ii) subjects the image data to such requisite processes as changing a compression format of the image data in an image file generating section 18 that is described hereinafter, and then (iii) sequentially transmits, to the other end via the communication lines, the image data subjected to the requisite processes.

Further, in a case where the communication device 5 receives the image data, the communication device 5 (i) carries out a communication procedure with the other end, (ii) receives image data that is transmitted from the other end and (iii) inputs the image data as original image data to the image processing apparatus 3. The image processing apparatus 3 (hereinafter referred to as an original image processing section 12) (i) carries out, with respect to the original image data that is inputted from the communication device 5, predetermined processes such as an extension process, a rotation process, a resolution conversion process, output tone correction and a tone reproduction process, (ii) combines superimposed image data with the original image data and (iii) outputs the composite image data to the image output device 4.

The operation panel (operation input section) 6 is configured by, for example, a display section (not shown) such as a liquid crystal display and an input section (not shown) such as a setting button. The operation panel 6 (i) displays, on the display section, information in accordance with an instruction of the main control section 7 of the image forming apparatus 1 and (ii) transmits, to the main control section, information that is inputted via the input section by a user. The user can input various instructions for the image forming apparatus 1 by use of the operation panel 6.

The main control section 7 is configured by, for example, a CPU (Central Processing Unit), and controls operations of sections of the image forming apparatus 1, based on (i) a program and various data that are stored in a ROM (not shown) or the like, (ii) information that is inputted from the operation panel 6, and the like.

The following describes in detail the image processing apparatus 3. As shown in FIG. 1, the image processing apparatus 3 includes: a control section 11; an original image processing section 12; a self-similar image storing section 13; a self-similar image selecting section 14; a superimposed image data generating section 15; a self-similar image detecting section 16; an image combining section 17; an output file generating section 18; and a composite image storing section 19.

The control section 11 controls operations of sections of the image processing apparatus 3, based on (i) an instruction that is inputted, by a user, via the main control section 7 from the operation panel 6 and (ii) a control instruction from the main control section 7. The instruction from the user may be inputted directly to the control section 11 from the operation panel 6. Further, the control section 11 may be provided as a part of the main control section 7, or the control section 11 may cooperate with the main control section 7 without being included in the main control section 7.

The original image processing section 12 carries out various image processes with respect to original image data that is inputted from the image input device 2 or the communication device 5 in order to convert the original image data into data suitable for an image output process carried out by the image output device 4. For example, the original image processing section 12 carries out, with respect to image data that is inputted from the image input device 2, such processes as A/D conversion, shading compensation, color balance adjustment, signal conversion, image quality adjustment, skew correction, top/bottom correction, image extraction, color conversion, black generation/under color removal, spatial filtering, halftone generation and output tone correction. Further, the original image processing section 12 carries out, with respect to image data that is inputted from the communication device 5, an extension process, a rotation process, a resolution conversion process, an output tone correction, a tone reproduction process and the like.

The self-similar image storing section 13 stores a plurality of patterns of self-similar images. Note that a self-similar image is a geometric figure that is configured so that a micro part of the self-similar image is similar in shape to the entire self-similar image and so that the self-similar image appears similar even if the self-similar image is enlarged or reduced. The self-similar image is also called a fractal geometric image.

Figure 2:
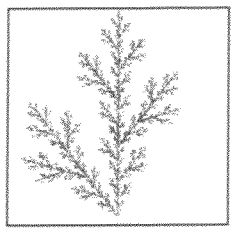
Figure 2:
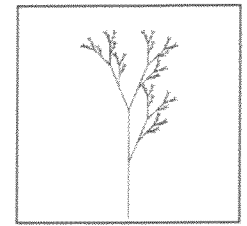
Figure 2:
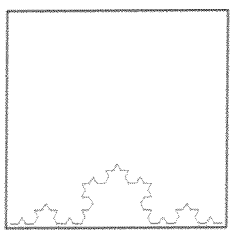
Figure 2:
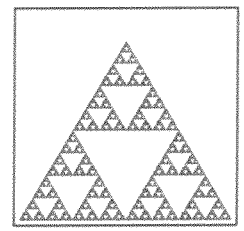

Examples of the self-similar image include a Leaf curve shown in FIG. 2(*a*), a binary tree curve (Tree curve) shown in FIG. 2(*b*), a Koho curve shown in FIG. 2(*c*) and a Gasket curve of Sierpinski shown in FIG. 2(*d*).

In a case where a self-similar image is combined as a superimposed image with original image data on which a self-similar image is not superimposed, the self-similar image selecting section 14 (i) selects a self-similar image according to an instruction of the control section 11 from self-similar image patterns that are stored in the self-similar image storing section 13, (ii) reads the selected self-similar image from the self-similar image storing section 13 and (iii) outputs the read self-similar image pattern to the superimposed image data generating section 15. The control section 11 commands the self-similar image selecting section 14 to select a pattern of a self-similar image which a user requests (a self-similar image which a user selects by use of the operation panel 6). Alternatively, the control section 11 may determine a self-similar image pattern, based on a specific condition (for example, the type of an original image), and may command the self-similar image selecting section 14 to select the determined pattern.

Furthermore, in a case where original image data with which a self-similar image has been already combined is enlarged or reduced, the self-similar image selecting section 14 (i) selects, from the self-similar image patterns that are stored in the self-similar image storing section 13, a self-similar image pattern in accordance with a self-similar image pattern which the self-similar image detecting section 16 detects from original image data, (ii) reads the selected self-similar image pattern from the self-similar image storing section 13, and (iii) outputs the read self-similar image pattern to the superimposed image data generating section 15. In the present embodiment, the self-similar image pattern in accordance with the self-similar image that is combined with the original image data is read from the self-similar image storing section 13. However, the present embodiment is not limited to this. For example, the self-similar image detecting section 16 may input, to the superimposed image data generating section 15, a self-similar image pattern that is detected from original image data by the self-similar image detecting section 16, and the superimposed image data generating section 15 may generate superimposed image data by adjusting the self-similar image pattern that is inputted from the self-similar image detecting section 16.

The superimposed image data generating section 15 generates superimposed image data made of a self-similar image by enlarging or reducing (adjusting) a size of a self-similar image pattern that is inputted from the self-similar image selecting section 14 so that the self-similar image pattern has a size in accordance with a draw size of an original image, and then outputs the superimposed image data to the image combining section 17. The control section (size determining section) 11 determines the draw size of the original image, based on an instruction that is inputted via the operation panel 6 by a user or a control instruction that is transmitted via the communication device 5 from other device. Alternatively, the type of the original image may be associated in advance with the draw size, and the control section 11 may determine the draw size in accordance with the type of the original image.

The self-similar image detecting section 16 determines whether or not a self-similar image has been combined with the original image data that is inputted from the image input device 2 or the communication device 5, and detects a pattern of the self-similar image if the self-similar image has been combined with the original image data. Subsequently, the self-similar image detecting section 16 transmits the detected pattern of the self-similar image or information for specifying the self-similar image pattern (for example, feature quantity of the detected self-similar image) to the self-similar image selecting section 14. Further, whether or not a self-similar image has been combined with original image data may be determined by, for example, matching a figure pattern included in a background region of an original image with each of self-similar image patterns that are stored in the self-similar image storing section 13. Furthermore, in a case where a self-similar image has been combined as a digital watermark image, whether or not the self-similar image has been combined with original image data may be determined (i) by detecting the digital watermark image by use of a conventionally well-known method for detecting a digital watermark image and (ii) by matching a pattern included in the detected digital watermark image with each of the self-similar image patterns that are stored in the self-similar image storing section 13.

The image combining section 17 combines original image data that is inputted from the original image processing section 12 with superimposed image data (image data made of a self-similar image) that is inputted from the superimposed image data generating section 15 so as to generate composite image data of the original image and the self-similar image, and then outputs the composite image data to the output file generating section 18. Further, in a case where image data of a self-similar image has been already superimposed on the original image data that is inputted from the original image processing section 12, the image combining section 17 superimposes, on the original image data, the image data of the self-similar image that is inputted from the superimposed image data generating section 15 in substitution for the data of the self-similar image that has been already superimposed on the original image data that is inputted from the original image processing section 12.

The output file generating section 18 generates an output file by carrying out, with respect to the composite image data that is inputted from the image combining section 17, a process according to a format of an image file that the image output device 4 uses (for example, a process of adding layout information, decoration information and the like to a header section of a file), and then outputs the output file to the image output device 4.

Further, the composite image storing section 19 may store the composite image data that is combined by the image combining section 17, and the output file generating section 18 may read the composite image data as appropriate in order to generate the output file, and then may output the output file to the image output device.

The following describes a flow of processes carried out by the image processing section 3 with reference to a flowchart shown in FIG. 3.

First, original image data is inputted to the image processing apparatus 3, and the control section 11 then commands the original image processing section 12 to carry out various image processes with respect to the original image data in order to convert the original image data into data suitable for an image output process carried out by the image output device 4 (S1), and also commands the self-similar image detecting section 16 to determine whether or not a self-similar image is superimposed on the original image data (S2).

In a case where the self-similar image detecting section 16 determines that the self-similar image is not superimposed on the original image data, the control section 11 commands the self-similar image selecting section 14 to select a self-similar image to be superimposed on the original image data, from self-similar images that are stored in the self-similar image storing section 13 (S3). For example, a user may make instruction to select a self-similar image by use of the operation panel 6, and the self-similar image selecting section 14 may select the self-similar image according to the selection instruction. Alternatively, the type of an original image may be associated in advance with a self-similar image to be superimposed, and the self-similar image selecting section 14 may select the self-similar image in accordance with the type of the original image.

Meanwhile, in a case where the self-similar image detecting section 16 determines that the self-similar image is superimposed on the original image data, the control section 11 commands the self-similar image detecting section 16 to detect a pattern of the self-similar image that is combined with the original image data (S4), and the control section 11 then commands the self-similar image selecting section 14 to select, from the self-similar image patterns that are stored in the self-similar image storing section 13, a self-similar image pattern in accordance with the self-similar image pattern which has been detected by the self-similar image detecting section 16 (S5).

Subsequently, the control section 11 commands the superimposed image data generating section 15 to adjust the self-similar image pattern that is selected in S3 or S5 so that a single self-similar image pattern is drawn regardless of a draw size (variable magnification, aspect ratio) of the original image, that is, so that a micro part included in the self-similar image appears constant in shape and size regardless of the draw size (S6).

For example, the self-similar image storing section 13 may store in advance a plurality of variable magnifications at which micro parts of a self-similar image appear constant in shape and size, the self-similar image selecting section 14 may select, from the plurality of variable magnifications that are stored in the self-similar image storing section 13, a variable magnification at which the whole of the self-similar image is the closest in size to an output image, and the superimposed image data generating section 15 may enlarge or reduce the self-similar image that is read from the self-similar image storing section 13. Alternatively, the self-similar image storing section 13 may store in advance a plurality of patterns of the self-similar images whose micro parts appear constant in shape and size, the self-similar image selecting section 14 may select, from the plurality of patterns that are stored in the self-similar image storing section 13, a pattern in which the whole self-similar image is the closest in size to the output image, and the self-similar image pattern that is read from the self-similar image storing section 13 may be used as superimposed image data. Furthermore, in a case where the pattern of the enlarged or reduced self-similar image or the read self-similar image is not identical in size to a superimposed image in accordance with the draw size of the original image, a redundant part of the self-similar image may be eliminated, or a part of the self-similar image may be transcribed onto a deficient part of the self-similar image.

Subsequently, the control section 11 commands the image combining section 17 to combine, with superimposed image data that is outputted from the superimposed image data generating section 15, original image data that is outputted from the original image processing section 12 (S7). For example, the image combining section 17 may combine the original image data with the superimposed image data so that the superimposed image is drawn as a background pattern (a background image) in a blank part of the original image or so that the superimposed image is combined as a digital watermark image that is difficult to be recognized by human eyes from a drawn image, a specific image process (digital watermark image detection process) may be carried out with respect to the drawn image and then a self-similar image that is combined as the digital watermark image with the original image may be detected.

Afterward, the control section 11 commands the output file generating section 18 to generate an output file by converting the composite image data that is combined by the image combining section 17 into a file format that is used by the image output device 4 (S8), and then commands the image output device 4 to draw (print or display) the generated output file (S9). As such, this series of processes is completed.

As described above, the image processing apparatus 3 of the present embodiment includes: the self-similar image storing section 13 that stores a self-similar image pattern; the superimposed image data generating section 15 that generates superimposed image data made of a self-similar image based on the self-similar image pattern; and the image combining section 17 that combines original image data with superimposed image data. The control section 11 detects a draw size of an original image in a case where the original image is drawn. The superimposed image data generating section 15 generates superimposed image data by adjusting a self-similar image pattern so that a size of a superimposed image corresponds to the draw size of the original image.

As such, it is possible to combine, with an original image, a superimposed image whose micro part appears substantially constant in size and shape regardless of the draw size of the original image. It is therefore possible to prevent the superimposed image from being not suitably detected draw size and to prevent design of the superimposed image from being impaired, depending on the draw size of the original image.

Figure 4:
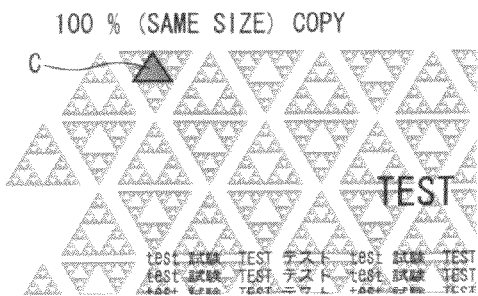
Figure 4:
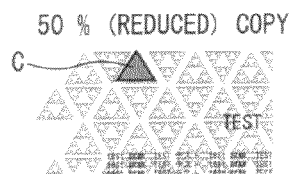
Figure 4:
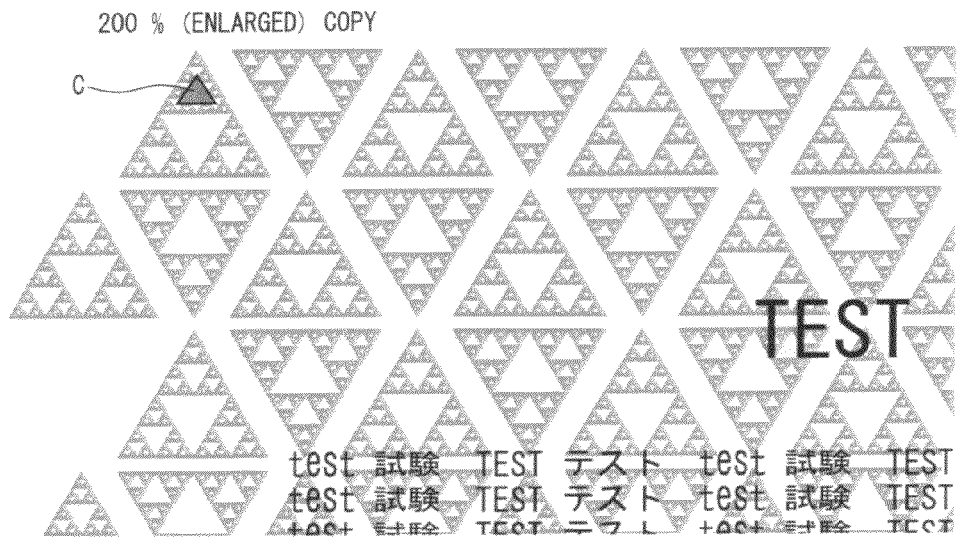

FIG. 4(*a*) to FIG. 4(*c*) are explanatory diagrams that show examples of an output image in a case where original image data on which a Gasket curve (a self-similar image) of Sierpinski is superimposed as a background pattern is copied in same size, in reduction size of 50% and in expansion size of 200%, respectively. As shown in FIG. 4(*a*) to FIG. 4(*c*), a self-similar image included in an output image always includes a single size and shape of micro parts (triangular parts represented by a reference sign C of FIG. 4(*a*) to FIG. 4(*c*)) regardless of variable magnification of the output image. Each of FIG. 4(*a*) to FIG. 4(*c*) shows a case of the original image data on which the Gasket curve of Sierpinski is superimposed as a background pattern. Note that even in a case where other self-similar image is used, a result identical to the result in the case where the Gasket curve is used can be obtained. FIG. 5 shows an example of original image data on which a binary tree curve (a self-similar image) is superimposed as a background pattern.

A method for superimposing superimposed image data made of a self-similar image on original image data is not particularly limited, and a conventionally well-known method can be used. For example, a pixel value of a pixel of superimposed image data which corresponds to a pixel of original image data may be added to a pixel value of the pixel of the original image data. Alternatively, the present embodiment may be arranged such that a position of the pixel of the original image data is associated in advance with a position of the pixel of the superimposed image data, and then the original image data and the superimposed image data are stored in different layers of an image file, and an image in accordance with the original image data may be superimposed on an image in accordance with the superimposed image data in order to draw an image in accordance with the image file.

As described above, it is also possible to combine the self-similar image as a digital watermark image with the original image so that the self-similar image cannot be recognized by human eyes from the drawn image. Each of FIG. 6(a) to FIG. 6(e) is an explanatory diagram that shows an example of a process that is carried out by the image combining section 17, in a case where the self-similar image is combined as a digital watermark image.

Figure 6:
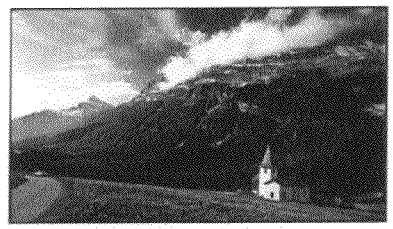
Figure 6:
Figure 6:
Figure 6:
Figure 6:
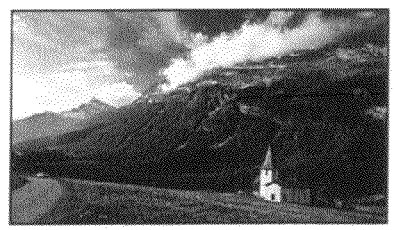

FIG. 6(a) is original image data (image data of RGB color space), and FIG. 6(b) is image data (image data of RGB color space) of a self-similar image to be superimposed on the original image data shown in FIG. 6(a).

First, the image combining section 17 carries out, with respect to the original image data shown in FIG. 6(a), a spatial frequency conversion process (for example, DCT conversion or Fourier transform) and a color space conversion process (for example, Lab conversion or LCC conversion). FIG. 6(c) shows a plain image (image data of Lab color space) of an original image with respect to which the color space conversion process has been carried out.

Secondly, the image combining section 17 superimposes (combines) image data of a self-similar image on (with) the original image data with respect to which the color space conversion process has been carried out. FIG. 6(d) shows an image obtained by superimposing the self-similar image on the plain image of the original image shown in FIG. 6(c).

Subsequently, the image combining section 17 carries out, with respect to composite image data in which the self-similar image has been superimposed, an inverse color conversion process opposite to the color conversion process that is carried out with respect to the original image data shown in FIG. 6(a), in order to generate composite image data of RGB color space. FIG. 6(e) shows composite image data that is obtained by the inverse color conversion process. As shown in FIG. 6(e), the above-mentioned combining method allows the self-similar image to be superimposed on the original image without being recognized by human eyes.

Further, a method for combining the superimposed image data as a digital watermark image with the original image data is not limited to the above-mentioned method, and conventionally well-known various methods can be used. Furthermore, a method for detecting superimposed image data from composite image data in which the superimposed image data is combined as a digital watermark image is not particularly limited, and the superimposed image data may be detected by use of any methods according to the method for combining the superimposed image data.

The present embodiment discusses a case where the original image data is inputted via the image input device 2 or the communication device 5. However, the present embodiment is not limited to this. For example, in a case where original image data that is stored in the composite image storing section 19 of the image processing apparatus 3 is enlarged or reduced or an aspect ratio of the original image data is changed and then the original image data is outputted, composite image data that is stored in the composite image storing section 19 may be inputted to the original image processing section 12 and the self-similar image detecting section 16, and then a process identical to the process carried out in the case where the original image data is inputted to the original image processing section 12 and the self-similar image detecting section 16 via the image input device 2 or the communication device 5 may be carried out with respect to the composite image data. Alternatively, the present embodiment may be arranged such that image data that is read from (i) other storing section included in the image processing apparatus 3 or (ii) various recording media provided in the image processing apparatus 3 so as to be detachable from the image processing apparatus 3 is inputted, as original image data, to the original image processing section 12 and the self-similar image detecting section 16, and then a process identical to the process carried out in the case where the original image data is inputted to the original image processing section 12 and the self-similar image detecting section 16 via the image input device 2 or the communication device 5 is carried out with respect to the image data.

In the present embodiment, the image processing apparatus 3 is designed such that when superimposed image data made of a self-similar image has been combined with original image data inputted to the image processing apparatus 3, the image processing apparatus 3 always combines the original image data with superimposed image data in accordance with a draw size of the original image and then outputs the composite image data. However, the present embodiment is not limited to this. For example, the image processing apparatus 3 may be arranged so as to store in advance a pattern of a self-similar image which is restricted to be outputted, and to determine whether or not a pattern of a self-similar image included in composite image data that is inputted to the image processing apparatus 3 is the pattern of the self-similar image which is restricted to be outputted, and if the pattern of the self-similar image included in the composite image data that is inputted to the image processing apparatus 3 is the pattern of the self-similar image which is restricted to be outputted, the image processing apparatus 3 neither generates nor outputs the composite image data. Further, the image processing apparatus 3 may be arranged such that a pattern of a certain self-similar image is set in advance in such a manner that composite image data (i.e. original image data+superimposed image data based on the certain self-similar pattern) is restricted to be outputted but the original image data obtained by removing the superimposed image data from the composite image data is allowed to be outputted, and such that if composite image data included in a self-similar image corresponding to the pattern is inputted, only original image data is outputted without outputting superimposed image data. Furthermore, the image processing apparatus 3 may be arranged such that a pattern of a certain self-similar image and user authentication information are set in advance in such a manner that composite image data that includes the certain self-similar image is allowed to be outputted only when user authentication succeeds, and such that when composite image data that includes a self-similar image corresponding to the pattern is inputted, a user authentication process is carried out, and the composite image data is allowed to be outputted only if user authentication succeeds.

Each section (each block) of the image processing apparatus 3 may be attained by software, using a processor such as a CPU. In this case, the image processing apparatus 3 includes: a CPU (central processing unit) that carries out an instruction of a control program that executes functions; a ROM (read only memory) that stores the control program; a RAM (random access memory) that develops the control program; a storing device (recording medium) such as a memory that stores the control program and various data; and the like. Further, an object of the present invention is attained (i) by providing, in the image processing apparatus 3, a recording medium that stores a computer-readable program code of the control program (an executable program, an intermediate code program, a source program) of the image processing apparatus 3 which control program is software that attains the above-mentioned functions and (ii) by reading and executing, by the computer (the CPU or a MPU), the program code that is stored in the recording medium.

Examples of the recording medium include: a tape-type such as a magnetic tape and a cassette tape; a disk-type including (i) magnetic disks such as a floppy (registered trademark) disk and a hard disk and (ii) optical disks such as a CD-ROM, a MO, a MD, a DVD and a CD-R; a card-type such as an IC card (including a memory card) and an optical card; and a semiconductor memory-type such as a mask ROM, an EPROM, an EEPROM and a flash ROM.

Further, the image processing apparatus 3 may be configured so as to be connectable to a communication network, and may be provided with the program code via the communication network. The communication network is not particularly limited. Examples of the communication network include the Internet, intranet, extranet, LAN, ISDN, VAN, a CATV communication network, a virtual private network, a telephone network, a mobile telecommunication network, a satellite communication network and the like. Furthermore, a transmission medium constituting the communication network is not particularly limited. Examples of the transmission medium include: wired lines such as an IEEE1394, a USB, a power-line carrier, a cable TV line, a telephone line, an ADSL line; and wireless communications which use infrared rays, such as an IrDA, a remote control; and wireless communications such as a Bluetooth (registered trademark), a 802.11 radio, a HDR, a mobile phone network, a satellite channel, a digital terrestrial network. Note that the present invention can be also realized by the program codes in the form of a computer data signal embedded in a carrier wave, which is the program that is electrically transmitted.

Moreover, each block of the image processing apparatus 3 not only can be attained by software, but also may be configured by hardware logic. (i) Hardware that carries out a part of processes and (ii) operation means that executes software which controls the hardware and which carries out processes other than those carried out by the hardware may be used together.

As described above, the image processing apparatus of the present invention is an image processing apparatus which combines, with original image data that is image data of an original image, superimposed image data that is image data of an image to be superimposed on the original image, the image processing apparatus including: at least one of (i) a self-similar image storing section that stores one or more patterns of self-similar images and (ii) a self-similar image detecting section that detects a pattern of a self-similar image that is combined with the original image data; a superimposed image data generating section that generates the superimposed image data from a self-similar image, based on the pattern of the self-similar image; an image combining section that generates composite image data by combining the original image data with the superimposed image data; and a size determining section that determines a draw size of the original image in a case where the original image is drawn, the superimposed image data generating section generating the superimposed image data by adjusting the pattern of the self-similar image so that a size of the superimposed image corresponds to the draw size.

According to the configuration, the superimposed image data generating section generates the superimposed image data by adjusting the pattern of the self-similar image so that the size of the superimposed image corresponds to the draw size of the original image which draw size is determined by the size determining section, and the image combining section generates the composite image data by combining the original image data with the superimposed image data. It is therefore possible to combine, with the original image, the superimposed image whose micro part appears substantially constant in size and shape regardless of the draw size of the original image.

The image processing apparatus of the present invention may be arranged such that the superimposed image data generating section adjusts the pattern of the self-similar image so that a micro part included in the superimposed image appears constant in shape and size regardless of the draw size.

According to the configuration, it is possible to combine, with the original image, the superimposed image whose micro part appears constant in size and shape regardless of the draw size of the original image.

The image processing apparatus of the present invention may be arranged such that the image combining section combines the superimposed image data with the original image data so that the superimposed image is drawn as a background image in the case where the original image is drawn.

According to the configuration, it is possible to draw, as a background image, a self-similar image whose micro part appears constant in size and shape regardless of a draw size of an original image. This prevents the shape and the size of the micro part included in the background image from differing depending on the draw size of the original image. It is therefore possible to prevent design of the background image from being impaired depending on the draw size of the original image.

The image processing apparatus of the present invention may be arranged such that the image combining section combines, with the original image data, the superimposed image data as a digital watermark image that a user cannot recognize by the user's eyes from an image that is drawn according to the composite image data.

According to the configuration, it is possible to draw, as a digital watermark image, a self-similar image whose micro part appears constant in size and shape regardless of a draw size of an original image. This prevents the shape and the size of the micro part included in the digital watermark image from differing depending on the draw size of the original image. It is therefore possible to overcome difficulty in determining whether or not the digital watermark image is a predetermined digital watermark image.

The image processing apparatus of the present invention may be arranged such that in a case where the image processing apparatus includes at least the self-similar image storing section, the superimposed image data generating section generates the superimposed image data, based on a pattern of a self-similar image that is read from the self-similar image storing section.

According to the configuration, it is possible to easily combine, with an original image, a superimposed image whose micro part appears substantially constant in size and shape regardless of a draw size of the original image, by adjusting, according to the draw size of the original image, the pattern of the self-similar image which is stored in advance in the self-similar image storing section. Further, since the superimposed image is generated based on the pattern of the self-similar image which is stored in advance, it is possible to generate the superimposed image data by an easy algorithm. This allows simplification of a configuration of the image processing apparatus.

The image processing apparatus of the present invention may be arranged such that in a case where the image processing apparatus includes at least the self-similar image detecting section, when the self-similar image detecting section detects a pattern of a self-similar image that is combined with the original image data, the superimposed image data generating section generates the superimposed image data, based on the detected pattern of the self-similar image, and the image combining section combines, with the original image data, the superimposed image data that is generated by the superimposed image data generating section in substitution for the self-similar image which has been superimposed on the original image data.

According to the configuration, it is possible (i) to detect the pattern of the self-similar image that has been already combined with the original image, (ii) to generate the self-similar image in accordance with the detected pattern of the self-similar image so that a micro part included in the self-similar image in accordance with the detected pattern of the self-similar image appears substantially constant in size and shape regardless of a draw size of the original image, and (iii) to combine the generated self-similar image with the original image. It is therefore possible to draw a self-similar image included in an original so that a micro part included in the self-similar image appears substantially constant in size and shape regardless of variable magnification and aspect ratio of an original image, even in a case where, for example, variable magnification copy (enlarged copy or reduced copy) or change in aspect ratio of the original is carried out.

The image processing apparatus of the present invention may be arranged such that in a case where the image processing apparatus includes both the self-similar image storing section and the self-similar image detecting section, when the self-similar image detecting section detects a pattern of a self-similar image that is combined with the original image data, the superimposed image data generating section (i) selects, from the self-similar image patterns that are stored in the self-similar image storing section, a pattern of a self-similar image which corresponds to the detected pattern of the self-similar image and (ii) generates the superimposed image data based on the selected self-similar image pattern.

According to the configuration, it is possible (i) to detect the pattern of the self-similar image that has been already combined with the original image, (ii) to generate a self-similar image that corresponds to the detected pattern of the self-similar image so that a micro part included in the self-similar image that corresponds to the detected pattern of the self-similar image appears substantially constant in size and shape regardless of a draw size of the original image and (iii) to combine the generated self-similar image with the original image. Further, even in a case where, for example, a part of the pattern of the self-similar image which is detected from the original image is damaged or deformed because of low accuracy etc. in reading an original, it is possible to read the pattern of the self-similar image that corresponds to the detected pattern of the self-similar image, from the self-similar image storing section and to use the read pattern of the self-similar image. This allows the self-similar image to be drawn more suitably.

An image data output processing apparatus of the present invention includes: any one of the above-mentioned image processing apparatuses; and an image output section that draws an image in accordance with the composite image data that is combined by any one of the above-mentioned image processing apparatuses.

According to the configuration, it is possible to draw (print or display) an image in which a superimposed image whose micro part appears substantially constant in size and shape regardless of a draw size of an original image is superimposed on the original image.

An image processing method of the present invention is an image processing method for combining, with original image data that is image data of an original image, superimposed image data that is image data of an image to be superimposed on the original image, the image processing method including the steps of: determining a draw size of the original image in a case where the original image is drawn; generating the superimposed image data from a self-similar image, based on a pattern of a self-similar image that is stored in advance or a pattern of a self-similar image that is combined in advance with the original image data; and generating composite image data by combining the original image data with the superimposed image data, in the step of generating the superimposed image data, the superimposed image data being generated by adjusting the pattern of the self-similar image so that a size of the superimposed image corresponds to the draw size.

According to the configuration, it is possible (i) to generate the superimposed image data by adjusting the pattern of the self-similar image so that the size of the superimposed image corresponds to the draw size of the original image, and (ii) to generate the composite image data by combining the original image data with the superimposed image data. It is therefore possible to combine, with the original image, the superimposed image whose micro part appears substantially constant in size and shape regardless of the draw size of the original image. This prevents the superimposed image from being not suitably detected and therefore prevents design of the superimposed image from being impaired, depending on the draw size of the original image.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to: an image processing apparatus and an image processing method which combine, with image data of an original image, superimposed image data that is image data of an image to be superimposed on the original image.

REFERENCE SIGNS LIST

1: Image Forming Apparatus (Image Data Output Processing Apparatus)
2: Image Input Device
3: Image Processing Apparatus
4: Image Output Device (Image Output Section)
5: Communication Device
6: Operation Panel
7: Main Control Section
11: Control Section (Size Determining Section)
12: Original Image Processing Section
13: Self-Similar Image Storing Section
14: Self-Similar Image Selecting Section
15: Superimposed Image Data Generating Section 16: Self-Similar Image Detecting Section
17: Image Combining Section
18: Output File Generating Section
19: Composite Image Storing Section

What is claimed:

1. An image processing apparatus, which combines, with original image data that is image data of an original image, superimposed image data that is image data of an image to be superimposed on the original image, the image processing apparatus comprising:
   at least one of (i) a self-similar image storing section that stores one or more patterns of self-similar images and (ii) a self-similar image detecting section that detects a pattern of a self-similar image that is combined with the original image data;
   a superimposed image data generating section that generates the superimposed image data from a self-similar image, based on the pattern of the self-similar image;
   an image combining section that generates composite image data by combining the original image data with the superimposed image data; and
   a size determining section that determines a draw size of the original image in a case where the original image is drawn,
   wherein:
   the superimposed image data generating section generates the superimposed image data by adjusting the pattern of the self-similar image so that a size of the superimposed image corresponds to the draw size, and
   the superimposed image data generating section generates the superimposed image data by adjusting the pattern of the self-similar image so that a micro part included in the superimposed image appears constant in shape and size regardless of draw size.

2. The image processing apparatus as set forth in claim 1, wherein:
   the image combining section combines the superimposed image data with the original image data so that the superimposed image is drawn as a background image in the case where the original image is drawn.

3. The image processing apparatus as set forth in claim 1, wherein:
   the image combining section combines, with the original image data, the superimposed image data as a digital watermark image that a user cannot recognize by the user's eyes from an image that is drawn in accordance with the composite image data.

4. The image processing apparatus as set forth in claim 1, wherein:
   in a case where the image processing apparatus comprises at least the self-similar image storing section,
   the superimposed image data generating section generates the superimposed image data, based on a pattern of a self-similar image that is read from the self-similar image storing section.

5. The image processing apparatus as set forth in claim 1, wherein:
   in a case where the image processing apparatus comprises at least the self-similar image detecting section,
   when the self-similar image detecting section detects a pattern of a self-similar image that is combined with the original image data, the superimposed image data generating section generates the superimposed image data, based on the detected pattern of the self-similar image; and
   the image combining section combines, with the original image data, the superimposed image data that is generated by the superimposed image data generating section in substitution for the self-similar image which is combined with the original image data.

6. The image processing apparatus as set forth in claim 4, wherein:
   in a case where the image processing apparatus comprises both the self-similar image storing section and the self-similar image detecting section,
   when the self-similar image detecting section detects a pattern of a self-similar image that is combined with the original image data, the superimposed image data generating section (i) selects, from the self-similar image patterns that are stored in the self-similar image storing section, a pattern of a self-similar image which corresponds to the detected pattern of the self-similar image and (ii) generates the superimposed image data based on the selected self-similar image pattern.

7. An image data output processing apparatus, comprising:
   an image processing apparatus as set forth in claim 1; and
   an image output section that draws an image in accordance with the composite image data which is combined by the image processing apparatus.

8. An image processing method for combining, with original image data that is image data of an original image, superimposed image data that is image data of an image to be superimposed on the original image,
   the image processing method comprising the steps of:
   determining a draw size of the original image in a case where the original image is drawn;
   generating the superimposed image data from a self-similar image, based on a pattern of a self-similar image which is stored in advance or a pattern of a self-similar image which is combined in advance with the original image data; and
   generating composite image data by combining the original image data with the superimposed image data,
   wherein in the step of generating the superimposed image data,
   the superimposed image data is generated by adjusting the pattern of the self-similar image so that a size of the superimposed image corresponds to the draw size, and
   the superimposed image data generating section generates the superimposed image data by adjusting the pattern of the self-similar image so that a micro part included in the superimposed image appears constant in shape and size regardless of draw size.

* * * * *